(12) United States Patent
Radovani

(10) Patent No.: US 12,070,910 B2
(45) Date of Patent: Aug. 27, 2024

(54) APPARATUS AND METHOD FOR HEATING A MOVABLE WEB

(71) Applicant: Fameccanica.Data S.p.A., San Giovanni Teatino (IT)

(72) Inventor: Asti Radovani, San Giovanni Teatino (IT)

(73) Assignee: Fameccanica.Data S.p.A.

( * ) Notice: Subject to any disclaimer, the term of this patent is extended or adjusted under 35 U.S.C. 154(b) by 39 days.

(21) Appl. No.: 17/947,424

(22) Filed: Sep. 19, 2022

(65) Prior Publication Data

US 2023/0090054 A1    Mar. 23, 2023

(30) Foreign Application Priority Data

Sep. 20, 2021 (EP) ..................... 21197723

(51) Int. Cl.
| | | |
|---|---|---|
| B65B 11/50 | (2006.01) | |
| B29C 65/00 | (2006.01) | |
| B29C 65/32 | (2006.01) | |
| B65B 9/02 | (2006.01) | |
| B65B 11/08 | (2006.01) | |
| B65B 11/10 | (2006.01) | |
| B65B 11/12 | (2006.01) | |
| B65B 51/10 | (2006.01) | |
| B65B 51/22 | (2006.01) | |
| B65B 51/28 | (2006.01) | |

(52) U.S. Cl.
CPC ............ *B29C 65/32* (2013.01); *B29C 66/433* (2013.01); *B65B 9/02* (2013.01); *B65B 11/08* (2013.01); *B65B 11/105* (2013.01); *B65B 11/12* (2013.01); *B65B 11/50* (2013.01); *B65B 51/10* (2013.01); *B65B 51/227* (2013.01); *B65B 51/28* (2013.01)

(58) Field of Classification Search
CPC ....... B65B 51/16; B65B 51/227; B65B 51/28; B65B 9/02; B65B 11/08; B65B 11/105; B65B 11/12; B65B 11/50; B65B 47/02; B65H 2301/43822; B65H 2301/51432; B65H 2301/51614; B29C 65/32
USPC ................................ 156/275.7, 272.2, 273.3
See application file for complete search history.

(56) References Cited

U.S. PATENT DOCUMENTS 2,374,504 A * 4/1945 Salfisberg ............... B65B 51/28
53/554
2,625,201 A * 1/1953 Smith ................. B29C 66/1122
219/244

(Continued)

FOREIGN PATENT DOCUMENTS

| DE | 19716706 A1 * 10/1998 | .............. B31F 1/285 |
| DE | 10206027 A1 * 9/2003 | ............. D21G 1/006 |

(Continued)

OTHER PUBLICATIONS

European Search Report dated Mar. 2, 2022. 5 pages.

*Primary Examiner* — Joshua G Kotis
(74) *Attorney, Agent, or Firm* — RMCK Law Group PLC

(57) ABSTRACT

A heating unit for heating a continuous web, includes a heating roller rotating about an axis of rotation and having an outer surface comprising a pattern of thermally conductive areas and thermally insulating areas, and at least one induction heater electromagnetically coupled to the thermally conductive areas of the outer surface of the heating roller.

10 Claims, 4 Drawing Sheets

(56) References Cited

U.S. PATENT DOCUMENTS

| | | | | |
|---|---|---|---|---|
| 3,466,212 A | * | 9/1969 | Clayton | B29C 65/245 |
| | | | | 156/292 |
| 3,472,723 A | * | 10/1969 | Lemelson | B29C 67/00 |
| | | | | 425/89 |
| 3,578,519 A | * | 5/1971 | Baumann | B29C 66/8221 |
| | | | | 53/488 |
| 3,626,480 A | * | 12/1971 | Takei | B29B 13/023 |
| | | | | 34/247 |
| 3,764,767 A | * | 10/1973 | Randolph | B29C 65/18 |
| | | | | 219/652 |
| 4,229,928 A | * | 10/1980 | Munchinger | B65B 25/02 |
| | | | | 53/469 |
| 4,657,625 A | * | 4/1987 | Kawakami | B29C 51/225 |
| | | | | 156/244.14 |
| 5,370,764 A | * | 12/1994 | Alikhan | B29C 65/18 |
| | | | | 156/290 |
| 5,613,601 A | | 3/1997 | Boulanger et al. | |
| 5,680,747 A | * | 10/1997 | Spatafora | B29C 66/91231 |
| | | | | 53/DIG. 2 |
| 6,050,055 A | * | 4/2000 | Calvert | B29C 66/8242 |
| | | | | 53/329.3 |
| 2003/0168444 A1 | * | 9/2003 | Liakopoulos | B29C 66/83423 |
| | | | | 219/659 |
| 2006/0048881 A1 | * | 3/2006 | Evans | B29C 66/45 |
| | | | | 156/64 |
| 2007/0001333 A1 | * | 1/2007 | Dias | B29C 35/0805 |
| | | | | 425/363 |
| 2008/0047658 A1 | * | 2/2008 | Von-Vajna | B29C 66/1122 |
| | | | | 156/196 |
| 2008/0250753 A1 | * | 10/2008 | Sperry | B29C 65/223 |
| | | | | 53/403 |
| 2011/0070004 A1 | * | 3/2011 | Mizumo | H05B 3/34 |
| | | | | 399/333 |
| 2011/0070005 A1 | * | 3/2011 | Mizumo | H05B 3/46 |
| | | | | 399/333 |
| 2013/0220541 A1 | | 8/2013 | Fujiwara et al. | |
| 2016/0339647 A1 | * | 11/2016 | Matsen | B29C 65/1416 |
| 2017/0030774 A1 | * | 2/2017 | Svenle | G01J 5/05 |
| 2017/0101204 A1 | * | 4/2017 | Waterman | B65B 47/02 |
| 2022/0396381 A1 | * | 12/2022 | Antonelli | B65B 9/02 |

FOREIGN PATENT DOCUMENTS

| | | | | |
|---|---|---|---|---|
| EP | | 2682254 A1 | 1/2014 | |
| WO | WO-2011134487 A1 | * | 11/2011 | ........ B65H 23/0251 |

\* cited by examiner

APPARATUS AND METHOD FOR HEATING A MOVABLE WEB

CROSS-REFERENCE TO RELATED APPLICATION

This application claims priority to European Patent Application No. 21197723.6 filed Sep. 20, 2021. The disclosure of the above application is incorporated herein by reference in its entirety.

FIELD OF THE INVENTION

The present invention relates in general to the packaging of articles, in particular of flat articles, i.e. articles having a thickness lower than the other dimensions.

The invention was developed, in particular, with a view to its application to packaging of articles enclosed between two opposite sheets having their edges joined by thermally-activated adhesive, e.g. in the field of packaging sanitary articles such as sanitary napkins, plasters, etc., for example, plasters for covering wounds, medicated plasters, pain-relieving plasters, heating plasters with and without medicaments.

More specifically, the invention relates to an apparatus and method for the localized heating of a continuous web moving in a longitudinal direction.

In the following description, reference will be made to this specific field without however losing generality.

PRIOR ART

In the medical field there are different types of plasters. In many cases, these products are boxed without being wrapped. In some cases, the plasters are packaged individually in envelope-shaped packages before being boxed.

Individual packaging of the plasters is carried out by enclosing the individual plasters between two flexible sheets overlapping each other, that enclose a respective plaster like a sandwich, and are joined together at their edges by adhesive. Typically, in this field the adhesive used is a thermally-activated adhesive because it guarantees stable fixing of the sheets so that the articles are protected from external agents. Thanks to these thermally-activated adhesives, once the package is opened, it is no longer resealable, and this allows the health and hygiene standards relating to plasters or other similar articles to be met. The packages may be formed by two sheets of paper, one of which has an inner surface on which a thermally-activated adhesive is applied. The sheet provided with the thermally-activated adhesive may be a layered material already provided with an adhesive.

In prior art apparatus, packaging of plasters between two flexible sheets is carried out by advancing a continuous array of plasters along a machine direction, spaced apart from each other, and two continuous webs overlapping each other on opposite sides of the continuous array of plasters, one of which has a layer of thermally-activated adhesive, so as to form a continuous composite tape consisting of the two continuous webs and the continuous array of plasters sandwiched between the two continuous webs. The packages are closed by passing the continuous composite tape through at least one pair of pressure rollers.

Fixing between the two webs takes place by activating the thermally-activated adhesive, which occurs while the flexible sheets are compressed together along the compression lines. Subsequently, the packages are obtained by transversally cutting the continuous composite tape along the transverse welds between each pair of articles.

One of the main problems of the apparatus according to the prior art is that the current maximum speed of the packaging equipment is in the order of 50-60 m/min. This speed limit is due to the fact that as the speed of the machine increases, the pressure rollers are unable to give the flexible sheets sufficient energy to allow the correct transfer of the adhesive material from one sheet to another because the contact time is proportionally reduced between the pressure rollers and the sheets. In this context, increasing the speed of the apparatus beyond the limit of 50-60 m/min would compromise the quality requirements prescribed by the plaster manufacturers.

U.S. Pat. No. 5,613,601A discloses a method and apparatus for heat-sealing dispensing packages comprising a water permeable bag formed by two non-woven webs which enclose predetermined quantities of a particulate product, such as tea or coffee, that releases a flavoring substance in steeping liquid. The non-woven webs have a thermally activated bonding surface permitting to permanently close the bag. One of the non-woven webs is wound on the outer surface of a heating roller which is locally heated by heating resistor embedded in the heating roller.

In some applications, in order to increase the speed of the packaging apparatus it may be necessary to heat localized areas a heating roller at very high temperatures, of the order of 200-250° C. In these cases, the construction of the heating roller should include a series of measures to protect various components from the high temperatures.

Also, the energy necessary to maintain a relatively small portion of the heating roller at the desired temperature is very large due to the heat dispersion through metal components of the heating roller.

In the prior art heating rollers heat is transferred from the heating resistors to the heating areas by conduction, which is slow by nature and is affected by the thermal inertia and by insulation characteristics of the element involved.

Another drawback of the prior art is that when the machine is started after a prolonged stop, a considerable time is necessary before reaching the working temperature of the heating roller.

OBJECT AND SUMMARY OF THE INVENTION

The object of the present invention is to overcome the problems of the prior art.

More specifically, an object of the invention is to provide an apparatus and method for packaging articles enclosed between two opposite flexible sheets, joined together by a thermally-activated adhesive, which allow a high production speed without compromising the quality of the packages.

According to the present invention, these objects are achieved by a method and by an apparatus having the characteristics forming the subject of the independent claims.

Optional features of the invention form the subject of the dependent claims.

The claims are an integral part of the disclosure submitted in relation to the invention.

BRIEF DESCRIPTION OF THE DRAWINGS

The present invention will now be described in detail with reference to the attached drawings, given purely by way of non-limiting example, wherein.

DETAILED DESCRIPTION

Figure 1:
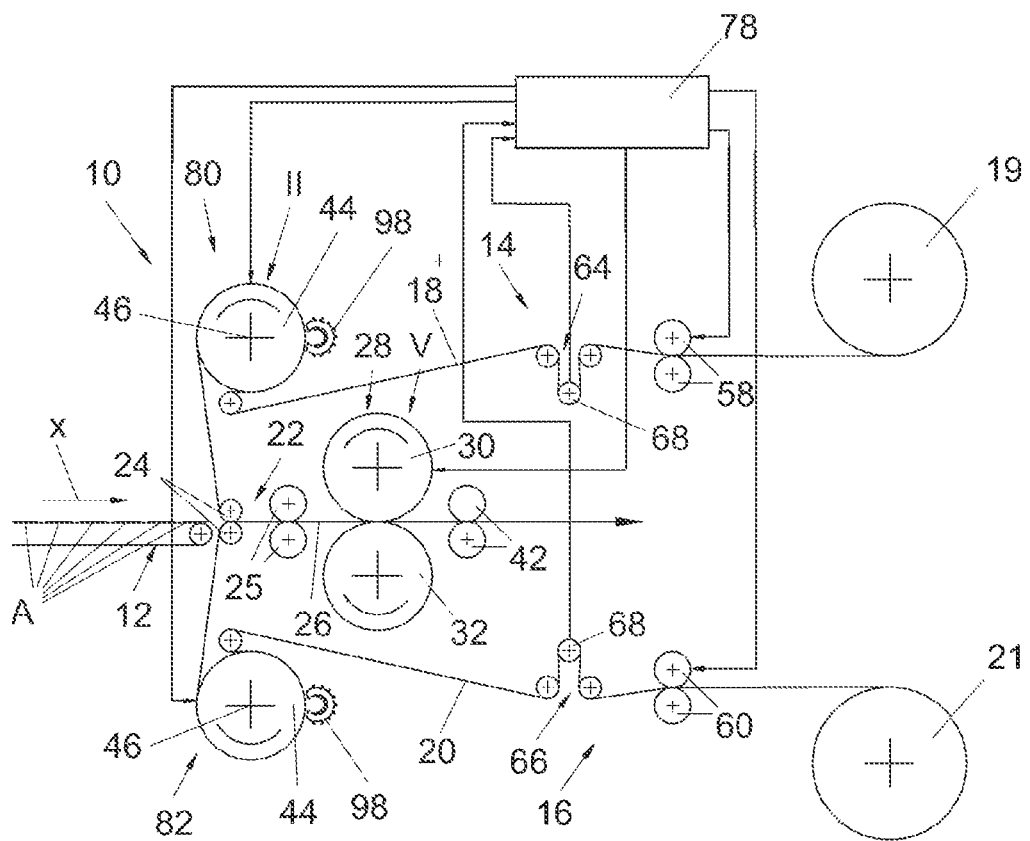
FIG. 1 is a schematic view of an apparatus for packaging articles according to the present invention.

With reference to FIG. 1, the numeral reference 10 indicates an apparatus for packaging flat articles A in envelope-shaped packages. The envelope-shaped packages are closed around the articles A along the edges of the packages.

The articles A may be wound-covering plasters, medicated plasters, pain-relief plasters, heating plasters, sanitary napkins, etc.

The articles A are aligned and spaced apart from each other in a continuous array that advances in a machine direction X on an inlet conveyor 12.

The apparatus 10 comprises a first feeding assembly 14 and a second feeding assembly 16 that feed, respectively, a first continuous web 18 and a second continuous web 20 towards an overlapping unit 22. The first and second continuous webs 18, 20 are unwound from respective reels 19, 21.

The continuous webs 18, 20 may be made of paper or plastic material. At least one of the two continuous webs 18, 20 comprises a thermally-activated adhesive. One of the two continuous webs 18, 20 may be a layered material provided with a thermally-activated adhesive. In other embodiments, the thermally-activated adhesive may be applied in-line using an adhesive dispenser. The thermally-activated adhesive layer may be applied or already present on the entire surface of at least one of the continuous webs 18, 20. The thermally-activated adhesive has no adhesive characteristics until it is heated above a preset temperature (activation temperature) for a preset time. After applying pressure, the thermally-activated adhesive fixes its state and, typically, even if heated again to the activation temperature, it no longer changes its state.

In a possible embodiment, the first continuous web 18 may be made of paper having a specific weight of 8.3 g/m$^2$ and may have a layer of thermally-activated adhesive over an entire surface, and the second continuous web 20 may be made of paper with a specific weight of 9 g/m$^2$ and may have on a surface a layer of silicone-like smooth material. The two continuous webs 18, 20 are coupled so that the surface with the thermally-activated adhesive of the first continuous paper sheet 18 comes into contact with the smooth surface of the second continuous web 20.

The overlapping unit 22 may comprise a pair of coupling rollers 24 tangential to each other and rotatable in opposite directions around respective axes parallel to each other and perpendicular to the machine direction X. The coupling rollers 24 may be idle around the respective axes of rotation.

The two continuous webs 18, 20 are kept in contact with the outer surfaces of the respective coupling rollers 24 while they advance towards the tangency area of the two coupling rollers 24.

The articles A are fed in the direction X between the two continuous webs 18, 20 towards the tangency area between the pair of coupling rollers 24. The two continuous webs 18, 20 are overlapped to each other on opposite sides with respect to the articles A while passing through the tangency area of the pair of coupling rollers 24.

Downstream of the overlapping unit 22, a continuous composite tape 26 is formed, comprising two continuous webs 18, 20 overlapped to each other, and a continuous array of articles A longitudinally spaced apart from each other and sandwiched between the two continuous webs 18, 20. One of the two continuous webs 18, 20 has a layer of thermally-activated adhesive arranged on its surface facing the other continuous web 18, 20.

The apparatus 10 comprises a compression unit 28 configured to fix to each other the two continuous webs 18, 20 by compressing the thermally-activated adhesive along sealing lines that extend around individual articles A.

The overlapping unit 22 and the compression unit 28 are two separate modules independent of each other, so that the steps of overlapping and compressing the two continuous flexible sheets 18, 20 are separate. In particular, the compression step is carried out when the step of enclosing the articles A between the flexible sheets 18, 20 is completed, so that the articles are completely enclosed between the continuous webs 18, 20 when the compression step is carried out.

Figure 5:
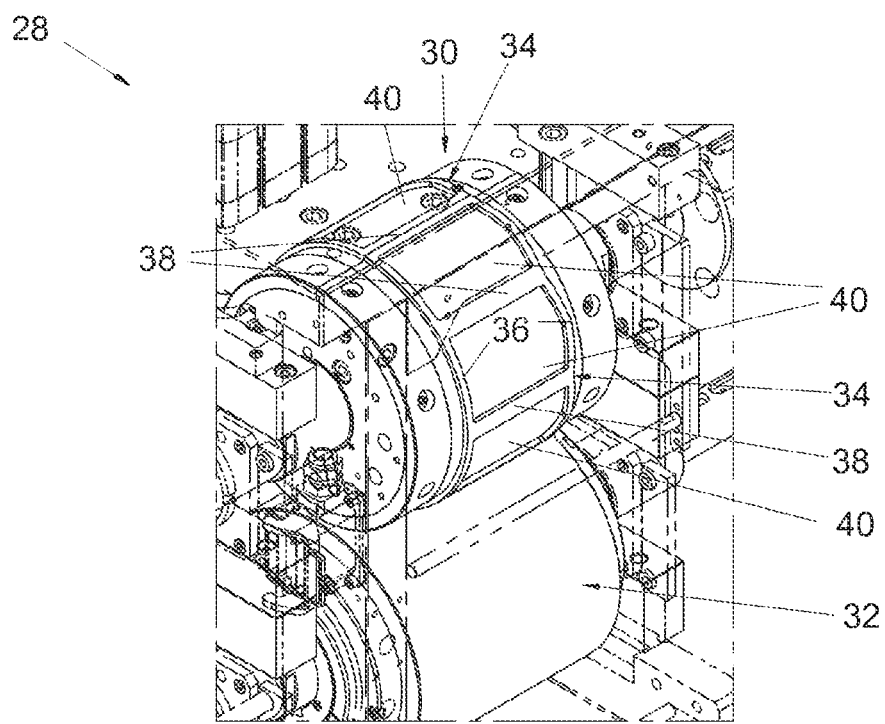
FIG. 5 is a perspective view of a compression unit indicated by the arrow V in FIG. 1.

With reference to FIG. 5, the compression unit 28 comprises first and second mutually cooperating compression rollers 30, 32, which are configured to compress the continuous composite tape 26 along frame-shaped compression areas 34 which surround respective articles A. The compression areas 34 are formed on the outer surface of the first compression roller 30. The compression areas 34 may be defined by two continuous longitudinal compression elements 36 and by a plurality of transverse compression elements 38. The compression areas 34 may be made of soft material, e.g. by silicone, in order to avoid the formation of markings on the two continuous webs 18, 20. The second compression roller 32 may have a smooth outer surface pressed against the longitudinal compression elements 36 and the transverse compression elements 38 of the first compression roller 30.

With reference to FIG. 1, a first pair of feeding rollers 25 may be arranged between the coupling rollers 22 and the compression rollers 30, 32 and a second pair of feeding rollers 42 may be arranged downstream of the compression rollers 30, 32. The first and second pair of feeding rollers 25, 42 are driven at the same peripheral speed and have the purpose of controlling the feeding speed of the continuous composite tape 26 as it passes through the compression unit 28. The first and second pair of feeding rollers 25, 42 may have recessed central portions to avoid compressing the articles A.

With reference to FIG. 1, the apparatus 10 comprises first and second heating units 80, 82 configured for heating the respective continuous webs 18, 20 upstream of the overlapping unit 22 as they move in the respective longitudinal directions.

Figure 2:
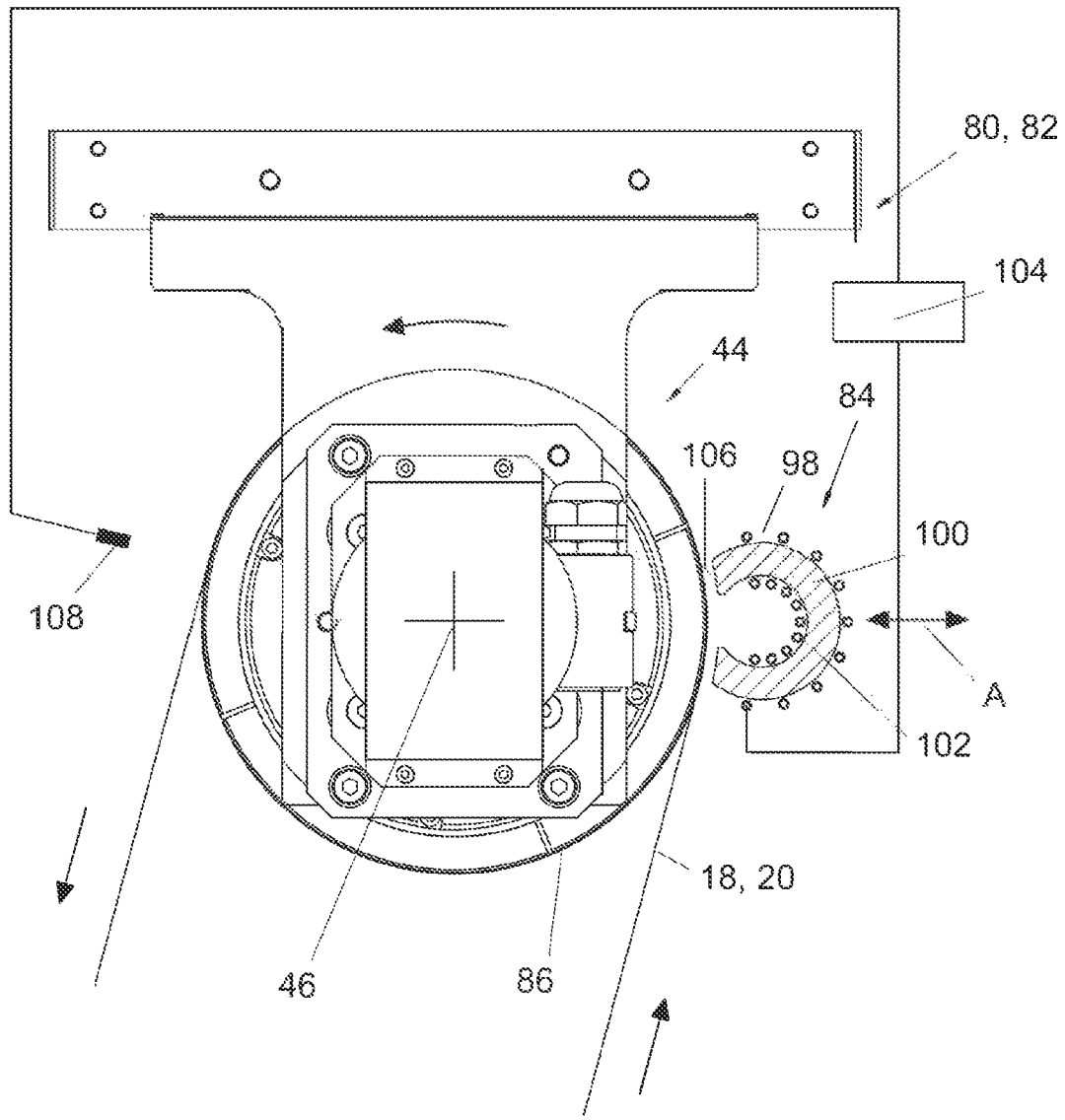
FIG. 2 is a side view of a heating unit indicated by the arrow II in FIG. 1.

With reference to FIG. 2, each heating unit 80, 82 comprises a respective heating roller 44 rotating about a respective axis of rotation 46 and a respective heating device 84.

Figure 4:
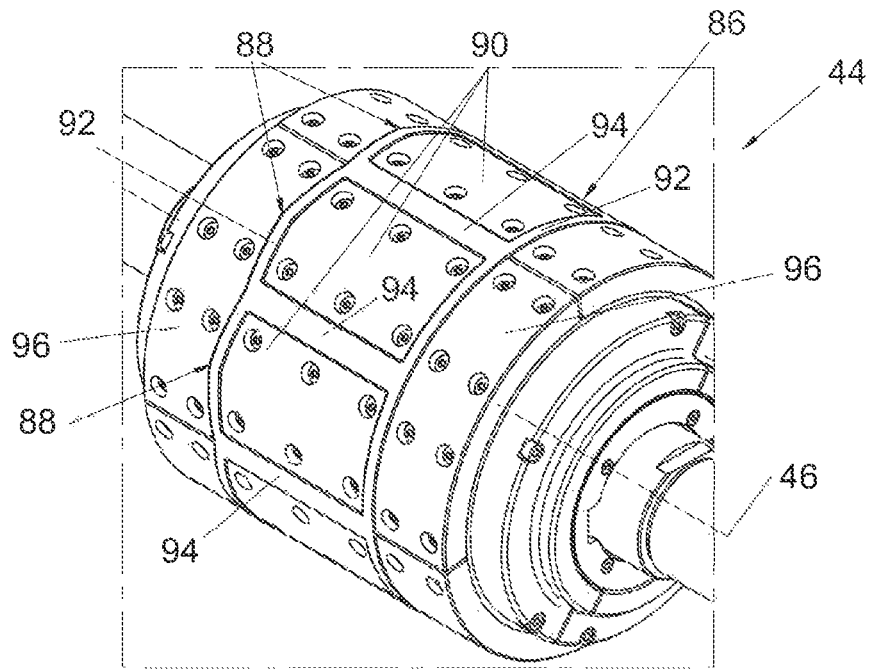
FIG. 4 is a perspective view of a heating roller indicated by the arrow IV in FIG. 3.

With reference to FIG. 4, the heating roller 44 of each heating unit 80, 82 has an outer surface 86 comprising a pattern of thermally conductive areas 88 and thermally insulating areas 90.

The thermally conductive areas 88 are made of a thermally conductive material e.g. steel. In a possible embodiment the thermally conductive areas 88 are frame-shaped and surround corresponding thermally insulating areas 90.

The thermally conductive areas 88 may be formed by two continuous longitudinal thermally conductive elements 92 and by a plurality of transverse elements 94 extending between the two continuous longitudinal thermally conductive elements 92. In a possible embodiment, the thermally conductive areas 88 may have the same shape as the compression areas 34 of the compression unit, so that the respective first and second continuous webs 18, 20 are heated along localized heating areas having the same shape as the compression areas 34.

The thermally insulating areas 90 may be formed by elements of thermally insulating material, e.g. Teflon© or Ultem©. Elements of thermally insulating material 96 may also be arranged laterally outwardly to the continuous longitudinal thermally conductive elements 92.

Figure 3:
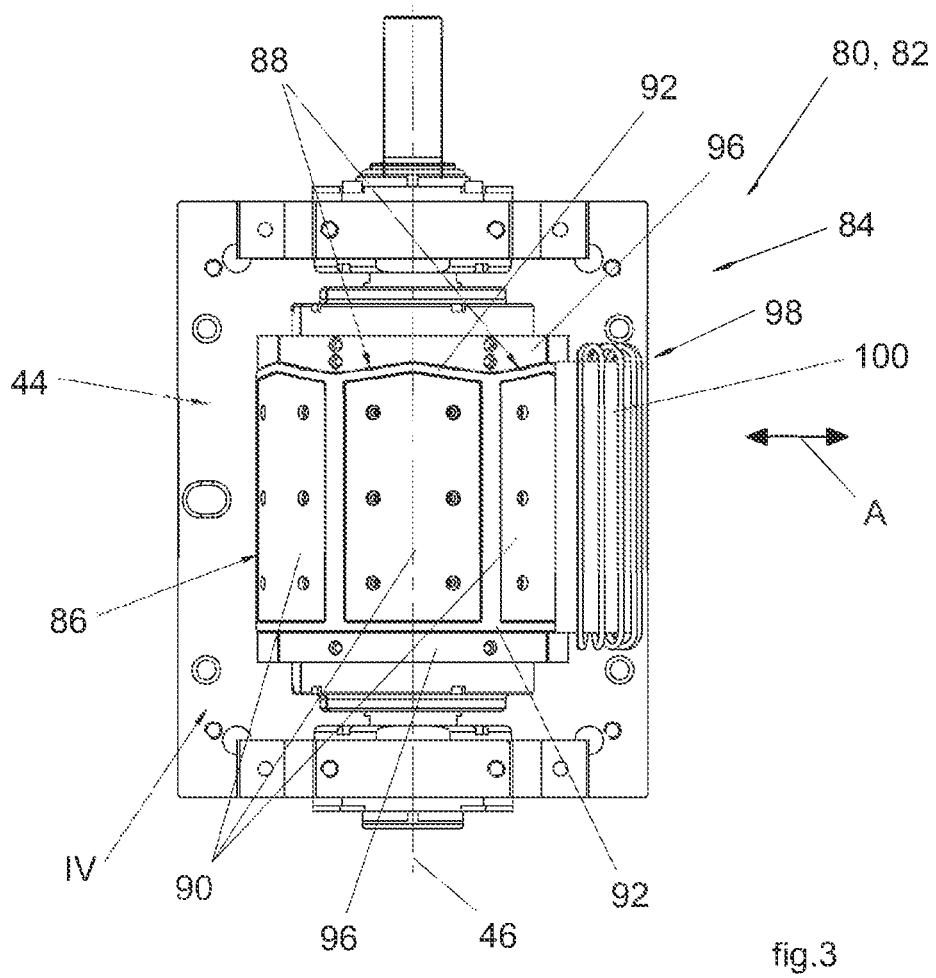
FIG. 3 is a plan view of the heating unit of FIG. 2.

With reference to FIGS. 2 and 3, the heating device 84 of each heating unit 80, 82 comprises at least one induction heater 98 electromagnetically coupled to the thermally conductive areas 88 of the outer surface 86 of the heating roller 44.

The induction heater 98 is configured for heating the thermally conductive areas 88 of the heating roller 44 by induction heating. Induction heating is the process of heating electrically conductive materials like metals by electromagnetic induction.

The induction heater 98 may comprise a magnetic core 100, an induction coil 102 and a power unit 104 that passes a high-frequency alternating current (AC) through the induction coil 102. The rapidly alternating magnetic field penetrates the thermally conductive areas 88, generating eddy currents inside the conducting material. The eddy currents flow through the thermally conductive areas 88, and heat them by Joule heating. The frequency of the electrical current used for induction heating depends on the object size, material type, coupling (between the work coil and the object to be heated) and the penetration depth.

An important feature of the induction heating process is that the heat is generated inside the thermally conductive areas 88 of the heating roller 44, instead of by an external heat source via heat conduction. Thus, the thermally conductive areas 88 can be heated very rapidly. Also, the induction heating of the thermally conductive areas 88 is concentrated on the surfaces of the thermally conductive areas 88 which came in contact with the first and second continuous webs 18, 20, with very little heat dispersion towards other parts of the heating roller, which reduces the energy required for the operation of the heating roller 44 and reduces the need for heat protection elements in the heating roller 44.

With reference to FIGS. 2 and 3, in a possible embodiment the induction heater 98 may be stationary. The magnetic core 100 may have an electromagnetic emitting window 106 facing the outer surface 86 of the heating roller 44. This is particularly advantageous in that the need of a rotary electric connector to feed movable electric heating elements is avoided. Another significant advantage is that the heating roller 44 may be replaced for changing the format of the packages without replacing the heating device 84.

In operation, the first or second continuous web is wound on the outer surface 86 of the heating roller 44 and passes through a narrow gap between the outer surface 86 and the electromagnetic emitting window 106.

The induction heater 98 may be movable with respect to the heating roller 44 in a direction A between a close up operative position and a spaced apart inoperative position, so that in the inoperative position the continuous web 18, 20 can be inserted more easily between the emitting window 106 and the outer surface 86 of the heating roller 44.

With reference to FIG. 2, the heating unit 82, 84 may comprise a temperature sensor 108 configured for detecting the temperature of the continuous web 18, 20 downstream of the induction heater 98. The power unit 104 may receive a temperature signal from the temperature sensor 108 and may be configured for adjusting the intensity of the electromagnetic field generated by the induction heater 98 depending on the temperature detected by the temperature sensor 108, so as to maintain the temperature of the continuous web 18, 20 within a predetermined range.

With reference to FIG. 1, the first and second feeding assemblies 14, 16 feed the respective first and second continuous webs 18, 20 on the outer surfaces of the respective heating rollers 44. The first and second continuous webs 18, 20 are wound on the outer surfaces of the respective heating rollers 44 with a wounding angle depending on the diameter of the heating rollers 44 and on the feeding speed of the first and second continuous webs 18, 20.

The heating rollers 44 heat the respective continuous webs 18, 20 along localized heating areas having the same shape as that of the thermally conductive areas 88. The continuous webs 18, 20 may be locally heated at a temperature which may be in the range of 200-250° C.

With reference to FIG. 1, the first compression roller 30 of the compression unit 28, and the heating rollers 44 are controlled by an electronic control unit 78, which drives the heating rollers 44 and the compression roller 30 around the respective axes at the same speed and maintains the heated areas of the continuous web and the compression areas 34 in phase with each other, so that the continuous composite tape 26 is compressed in compression areas 34 overlapped to respective heating areas of the first and second continuous webs 18, 20.

The heating of the continuous flexible webs 18, 20 on the heating rollers 44 allows a much greater speed of the continuous composite tape 26 during the passage through the compression unit 28.

The first and second feeding assemblies 14, 16 may be configured for feeding the first and second continuous webs 18, 20 along respective longitudinal directions with a longitudinal tension which may be comprised between 50-200 N. With continuous webs made of paper an optimal tension is about 100 N. This tension is maintained in the path of the first and second continuous webs 18, 20 extending from the respective feeding assembly 14, 16 up to the compression unit 28.

With reference to FIG. 1, in a possible embodiment, the first and second feeding assemblies 14, 16 may comprise respective feeding rollers 58, 60 which may be driven with a peripheral speed lower than the peripheral speed of the feeding rollers 25, 42 in order to keep the first and second continuous webs 18, 20 longitudinally tensioned. The electronic control unit 78 may control the peripheral speed of the feeding rollers 58, 60, on the basis of signals provided by tension measuring devices 64, 66 which measure the longitudinal tension of the respective first and second continuous paper sheet 18, 20. Each tension measuring devices 64, 66 may comprise a load cell 68 formed by an idle roller on which the first or second continuous paper sheet 18, 22 is wound. The load cells 68 send to the electronic control unit 78 signals indicating the longitudinal tensions of the first and second continuous paper sheet 18, 22. If, for any reason, the longitudinal tension of the first and second continuous paper sheet 18, 20 varies with respect to the preset value, the electronic control unit 78 varies the speed of the feeding rollers 58, 60 to keep the tension of the first and second continuous paper sheet 18, 22 at the preset value.

Of course, without prejudice to the principle of the invention, the details of construction and the embodiments can be widely varied with respect to those described and illustrated, without thereby departing from the scope of the invention as defined by the claims that follow.

The invention claimed is:

1. An apparatus for packaging articles, comprising:
   first and second feeding assemblies configured for feeding first and second continuous webs in respective longitudinal directions,
   an inlet conveyor configured for feeding a flow of articles between said first and second continuous webs,
   an overlapping unit configured for overlapping to each other the first and second continuous webs on opposite sides of said flow of articles,
   a compression unit configured for compressing said first and second continuous webs around articles of said flow of articles, and
   at least one heating unit for heating at least one of said first and second continuous webs, the at least one heating unit comprising:
      a heating roller rotating about an axis of rotation and having an outer surface comprising a pattern of thermally conductive areas and thermally insulating areas, and
      a heating device for heating said thermally conductive areas, comprising at least one induction heater electromagnetically coupled to said thermally conductive areas of the outer surface of the heating roller.

2. The at least one heating unit of claim 1, wherein said at least one induction heater is stationary.

3. The at least one heating unit of claim 1, wherein said at least one induction heater has an electromagnetic emitting window facing said outer surface of the heating roller.

4. The at least one heating unit of claim 1, wherein the pattern of thermally conductive areas comprises a plurality of frame-shaped thermally conductive areas surrounding corresponding thermally insulating areas.

5. The at least one heating unit of claim 1, wherein said thermally conductive areas are formed by two continuous longitudinal thermally conductive elements and by a plurality of transverse heating elements extending between the two continuous longitudinal thermally conductive elements.

6. A method for packaging articles, comprising:
   providing first and second feeding assemblies configured for feeding first and second continuous webs in respective longitudinal directions,
   providing an inlet conveyor configured for feeding a flow of articles between said first and second continuous webs,
   providing an overlapping unit configured for overlapping to each other the first and second continuous webs on opposite sides of said flow of articles,
   providing a compression unit configured for compressing said first and second continuous webs around articles of said flow of articles, and
   providing at least one heating unit for heating at least one of said first and second continuous webs, the at least one heating unit comprising:
      a heating roller configured to rotate about an axis of rotation and having an outer surface comprising a pattern of thermally conductive areas and thermally insulating areas, and
      a heating device for heating said thermally conductive areas, comprising at least one induction heater electromagnetically coupled to said thermally conductive areas of the outer surface of the heating roller, and
   generating, by said at least one induction heater, an electromagnetic field inductively coupled to said thermally conductive areas so as to heat said thermally conductive areas by induction heating.

7. The method of claim 6, wherein said electromagnetic field is emitted through an electromagnetic emitting window facing said outer surface of the heating roller.

8. The method of claim 6, further comprising:
   feeding in the respective longitudinal directions, the first and second continuous webs, at least one of which has a thermally activated adhesive on one surface thereof,
   feeding the flow of articles between said first and second continuous webs,
   overlapping said first and second continuous webs on opposite sides of said flow of articles, and
   compressing said first and second continuous webs around articles of said flow of articles and fixing to each other said first and second continuous webs by said thermally activated adhesive,
   wherein before overlapping said first and second continuous webs on opposite sides of said flow of articles, at least one of said first and second continuous webs is passed on the outer surface of the heating roller heated by induction heating.

9. The method of claim 8, wherein said at least one of said first and second continuous webs is locally heated along frame-shaped heating areas.

10. The method of claim 9, wherein said first and second continuous webs are compressed along frame-shaped compression areas surrounding respective articles of said flow of articles and overlapped to respective heating areas.

* * * * *

UNITED STATES PATENT AND TRADEMARK OFFICE
CERTIFICATE OF CORRECTION

| | | |
|---|---|---|
| PATENT NO. | : 12,070,910 B2 | Page 1 of 1 |
| APPLICATION NO. | : 17/947424 | |
| DATED | : August 27, 2024 | |
| INVENTOR(S) | : Asti Radovani | |

It is certified that error appears in the above-identified patent and that said Letters Patent is hereby corrected as shown below:

On the Title Page

(71) Applicant address information should be listed as:
- Fameccanica.Data S.p.A., San Giovanni Teatino (Chieti), ITALY -

(72) Inventor address information should be listed as:
- Asti RADOVANI, San Giovanni Teatino (Chieti), ITALY -

Signed and Sealed this
Twenty-fifth Day of March, 2025

Coke Morgan Stewart
*Acting Director of the United States Patent and Trademark Office*